Figure 1:
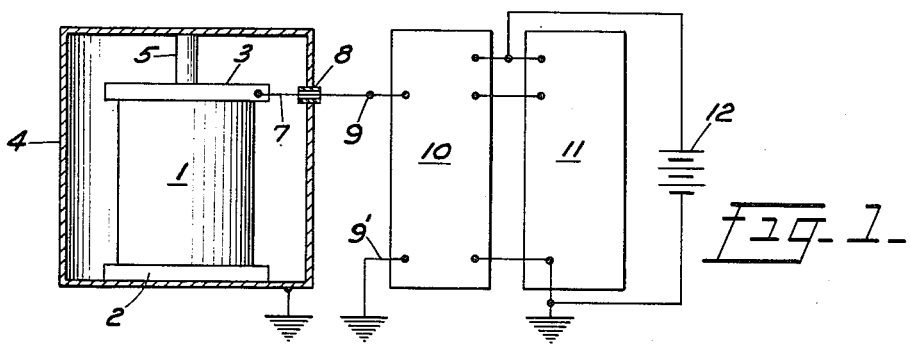

Dec. 22, 1953     P. E. OHMART     2,663,802
NEUTRON DETECTOR
Filed Dec. 11, 1951

INVENTOR.
Philip E. Ohmart
BY
Roland A. Anderson
ATTORNEY

Patented Dec. 22, 1953

2,663,802

UNITED STATES PATENT OFFICE 2,663,802

NEUTRON DETECTOR

Philip E. Ohmart, Dayton, Ohio, assignor to the United States of America as represented by the United States Atomic Energy Commission Application December 11, 1951, Serial No. 261,021

7 Claims. (Cl. 250—83.3)

The present invention relates to radiation detection, and more especially to a novel method of and apparatus for detection of neutrons.

Neutrons are relatively difficult to detect because they do not directly ionize a gas in passing therethrough. In order to detect neutrons, therefore, methods of the prior art have generally employed either the combination of a counting volume with a neutron absorber such as boron-10 which emits an ionizing radiation after it absorbs a neutron, or a counting volume with a liner or coating material like paraffin, from which fast neutrons may knock charged particles into the counting volume. Each of these methods depends upon an associated counting volume, where ionization of a gas occurs, and ions are collected by oppositely charged electrodes. Such counting volumes necessarily require a high voltage power supply to furnish the necessary electrostatic field between the electrodes to collect the ions. Moreover an especial counter filling gas and a gas-tight container are generally required. Yet of more importance is the fact that such counting volumes ordinarily are very sensitive to gamma radiation, and most now-known neutron emission has associated with it a large quantity of gamma emission. In practice, it is very difficult to divide or separate the counts from gamma radiation from those caused by the neutrons.

It has recently been proposed to detect neutrons by observing scintillations produced within certain phosphor crystals with a photomultiplier tube. Such tubes require elaborate voltage supplies; the crystals are relatively difficult to grow; and the overall system is generally very gamma sensitive and energy dependent.

With a knowledge of the difficulties of the prior art, I have provided a novel method of and apparatus for neutron detection and counting. I have discovered that fast neutrons impinging on an electret, a "permanently" polarized dielectric, will cause a series of rapid changes in the volumetric charge thereof, due probably to an instantaneous disarrangement of the internal structure of the electret. I have further discovered that these instantaneous changes in charge may be detected by suitable means, such as a pair of electrodes disposed in confronting relation and conductively coupled to opposite faces of the electret, and counted, if desired. The change in charge of the electret will change the surface charge induced on the electrodes, and this change may be amplified in a vacuum tube or other suitable means. Successive neutron-induced changes will appear as voltage pulses, and may be coupled to pulse counting means of any convenient type to determine the counting rate, which is proportional to the number of neutrons incident on the electret per unit time.

Accordingly, it is an object of my invention to provide a novel method of and means for detecting neutrons.

A further object of my invention is to provide a novel neutron detector which is relatively insensitive to gamma radiation.

Still a further object of my invention is to provide a neutron detector which requires no associated detector high voltage supply and no ion collecting means.

Figure 2:
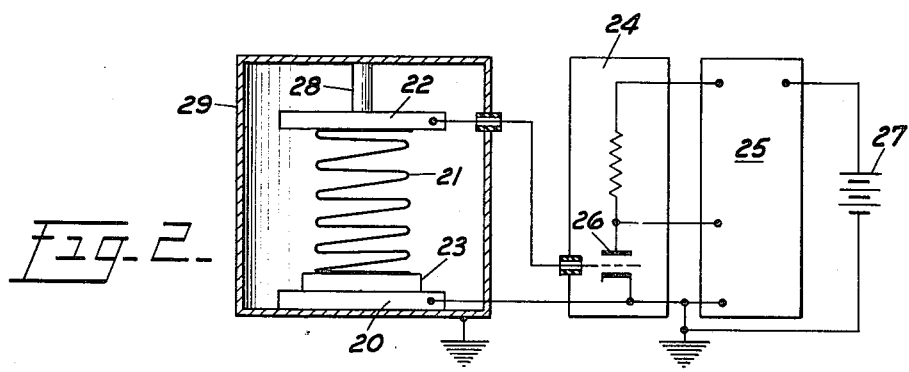
Figure 3:
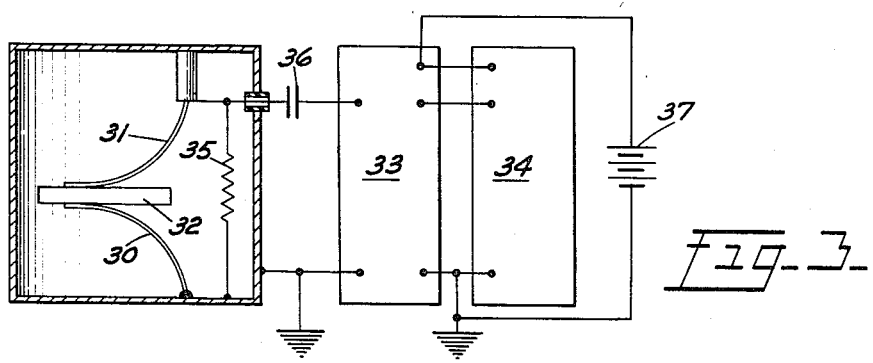

Other objects and advantages of my invention will become apparent from the following detailed description of my invention when read in connection with the appended drawings, in which, Figure 1 is a schematic diagram illustrating my generic invention;

Figure 2 illustrates schematically one embodiment of the invention of Figure 1; and Figure 3 is a schematic representation of a preferred embodiment of the generic invention shown in Figure 1.

Referring now to Figure 1, electret 1 is disposed between electrodes 2 and 3, with its oppositely charged faces contacting these electrodes. Housing 4 may be provided to electrically shield the electrodes and to furnish support means therefor. Support 5 is fastened to housing 4 to maintain electrode 3 in firm contact with the electret, and is electrically insulated from the housing. Conductive means or wire 7 contacts the electrode 3, passes through aperture or insulator 8, and connects to the input 9 of the voltage amplifying means 10. Shield 4 and electrode 2 may be grounded, as is the other side 9' of the input to amplifier 10. The output of the voltage amplifier is coupled to pulse counting means 11. Battery 12 represents the power supply for energizing the amplifier and counting means.

The electrodes 2, 3 should be electrically conductive and may be fabricated of any convenient substance, such as brass or aluminum. The housing 4 serves as an electrical shield and accordingly should be metallic. Insulator 8 need not be a high voltage insulator but may be any common form of electrical insulator such as Bakelite, quartz, and the like. Designs of the voltage amplifier 10 and pulse counting means 11 are not critical, and these circuits may take the forms common to the prior art. For example the voltage amplifier may be a single vacuum tube having the grid connected to terminal 9 and the cathode connected to terminal 9'. A lead from the anode might then be coupled to counting means 11. The electret 1 may be a thin wafer disc made in the conventional manner from 45% resin, 45% carnauba wax, and 10% beeswax. A method of preparing electrets has been described in "Reviews of Modern Physics," July 1948.

Another feasible means for detecting the change in surface charge of the electret under neutron bombardment is illustrated in Figure 2. The housing 29 carries insulator 28, which supports disc electrode 22. An electret 23 is placed with the positively charged face upon electrode 20. A phosphor bronze spring 21 is suspended from electrode 22 and presses against the negatively charged surface of electret 23. The electrode 22 is directly connected to the input of a voltage amplifier 24, a direct connection from electrode 20 forming the other side of the input circuit. The amplifier feeds pulse counting means 25. The electret in this instance furnishes sufficient grid bias to operate a vacuum tube 26 shown within the voltage amplifier 24 as a preferred embodiment thereof. Battery 27 represents schematically the power supply for energizing the amplifier and counting means. The electret could be inverted, in which case separate bias for the amplifier 26 must be provided in the conventional manner.

A preferred means for detecting changes in electret charge utilizes a pair of leaf spring electrodes, as may be seen from Figure 3. Electrodes 30, 31 are disposed in confronting relation and electret 32 is placed therebetween with its charged faces contacting the electrodes. Preferably the negatively charged face contacts electrode 31. The two electrodes are directly connected to the input circuit of voltage amplifier 33, which is coupled to pulse counting means 34. A preferred means for coupling the electrodes to the amplifier comprises a resistor 35 connecting electrode 31 to electrode 30 and a capacitor 36 connecting the electrode 31 to the input of the voltage amplifier. With this resistance-capacitance coupling between the electret and the associated amplifier circuit, fatigue effects of the electret due to constant neutron irradiation are greatly reduced. Battery 37 represents the power supply for energizing amplifier 33 and counting means 34.

In operation, an electret coupled to two confronting electrodes is exposed to a field of neutrons. A neutron passing through the electret may collide with the molecules thereof and cause an internal disarrangement of short duration therein. This internal disturbance causes a corresponding instantaneous change in the volume charge of the electret. This change in volume charge appears on the electrodes as a change in the induced surface charge thereof, whether the electrodes are directly connected to both ends of an electret, or connected through a spring or other suitable means to the electret. The rapid changes in surface charge, when amplified, appear as voltage pips or pulses, which may be counted in a conventional manner. The pulse counting means may be a scaler circuit with associated indicators, may be a counting rate meter circuit which indicates the time rate of occurrence of pulses, or any of the great variety of pulse counters known to the prior art. It is not material whether pulses are merely counted, or their time rate of occurrence is measured and indicated, the term "pulse counting means" being used to describe both types of operation in the conventional manner.

The electrets may be molded in tin dishes, as is commonly done, or may be formed in cylindrical molds consisting of a section of insulating tubing with a tin disc pressed in the bottom. The thickness of the electret is not of major import, but best results are obtained with electrets of substantially 3 mm. thickness, though thicknesses of 1.25 cm. and above have been successfully employed. The spacing of the electrodes is not critical but varies with the thickness of the electret, the charge on the surface thereof and the size of the electrodes themselves.

The spring contacts are preferred to the disc electrodes because the capacity between contacts is much smaller, and the pulses are, therefore, larger. To reduce microphonic effects, yet keep capacity low a compromise may be effected by having one small disc electrode for support, together with a spring contact for the other electrode.

It is apparent from the foregoing description of the principles of operation of my invention that I have provided a new and novel neutron detector which overcomes many of the difficulties inherent in the prior art of neutron detection.

Having thus described my invention I claim:

1. A neutron detector comprising an electret for exposure to incident neutrons, means electrically coupled to said electret for detecting the changes in volume charge thereof induced by neutron bombardment, and means coupled to said detecting means for counting and indicating the time rate of occurrence of said changes said rate being proportional to the rate of incidence of neutrons on said electret.

2. A neutron detector comprising a pair of electrodes disposed in spaced relation, an electret disposed between said electrodes and having opposite faces thereof conductively coupled to the respective confronting electrodes, and means for detecting and counting voltage transients induced in said electrodes by the changes in volume charge of said electret responsive to neutron bombardment thereof.

3. A neutron detector comprising first and second electrodes disposed in spaced relation, an electret disposed between the electrodes and having oppositely charged surfaces conductively coupled to the respective confronting electrodes, and means for detecting voltage transients induced in said electrodes, including voltage amplifying means associated with said electrodes, and pulse counting means associated with said amplifying means.

4. A neutron detector including a pair of electrodes disposed in spaced relation, an electret disposed between the electrodes with its positively charged surface conductively coupled to one of said electrodes and its negatively charged surface conductively coupled to the other of said electrodes, a voltage amplifier including a vacuum tube having plate, grid, and cathode electrodes, means coupling said other of said electrodes to said grid to provide grid-cathode bias for said tube, means coupling said first electrode to said cathode, and pulse counting means coupled to said voltage amplifier.

5. A neutron detector including first and second leaf springs disposed in spaced relation, an electret held therebetween with oppositely charged surfaces thereof contacting respective springs, voltage amplifying means including input and output circuits associated therewith, resistance means connected between said electrodes, capacitance means connecting said second electrode with one side of said input circuit, means coupling said first electrode with the other side of said input circuit, and pulse counting means coupled to said output circuit.

6. A neutron detector including first and second leaf springs disposed in spaced relation, an electret held therebetween with oppositely charged surfaces thereof contacting respective springs voltage amplifying means including input and output circuits associated therewith, and pulse counting means coupled to said output circuit.

7. A neutron detector including first and second electrodes disposed in spaced relation, an electret disposed between said electrodes and contacting said first electrode with one charged surface, spring contacting means coupling the other surface of said electret with said second electrode, voltage amplifying means comprising a vacuum tube having plate, grid, and cathode electrodes, said grid electrode being connected to said second electrode and cathode being connected to said first electrode, and pulse counting means connected in circuit with said plate and cathode electrodes.

PHILIP E. OHMART.

References Cited in the file of this patent

UNITED STATES PATENTS

| Number | Name | Date |
|---|---|---|
| 2,284,039 | Bruno | May 26, 1942 |
| 2,537,388 | Wooldridge | Jan. 9, 1951 |
| 2,604,596 | Ahearn | July 22, 1952 |